Feb. 24, 1925.

L. F. LEVY

PHOTOGRAPHIC APPARATUS

Filed Aug. 14, 1922

LIONEL F. LEVY
INVENTOR

BY
his ATTORNEY.

Feb. 24, 1925.  1,527,420
L. F. LEVY
PHOTOGRAPHIC APPARATUS
Filed Aug. 14, 1922   2 Sheets-Sheet 2
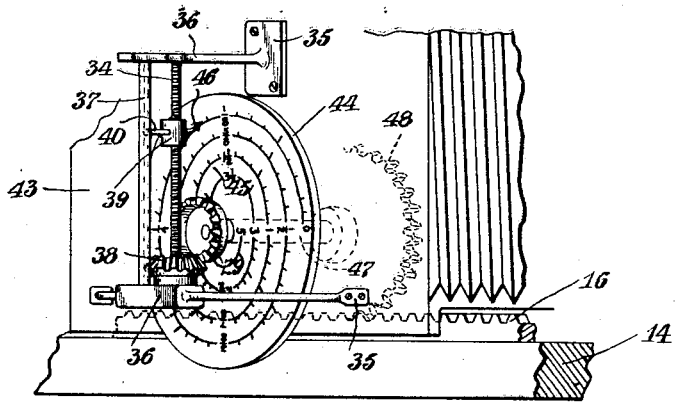
Fig. 4.
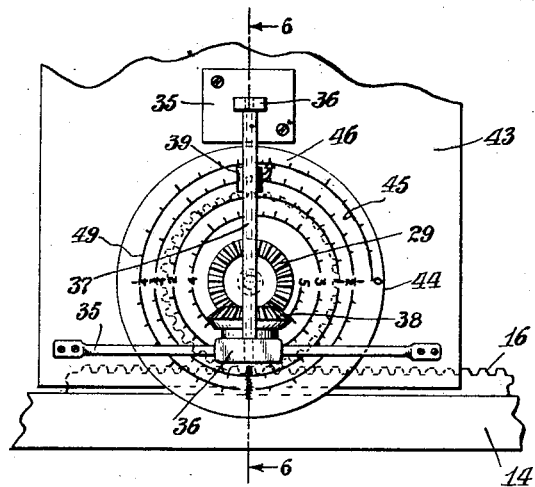
Fig. 5.
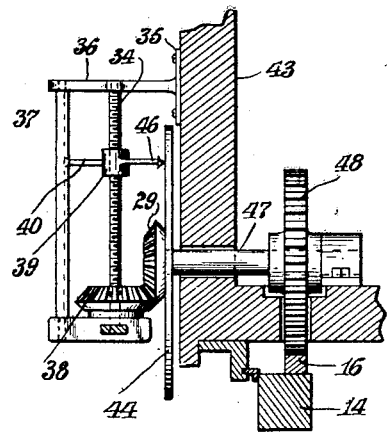
Fig. 6.
LIONEL F. LEVY
INVENTOR
BY 
his ATTORNEY.

Patented Feb. 24, 1925.

1,527,420

UNITED STATES PATENT OFFICE.

LIONEL F. LEVY, OF PHILADELPHIA, PENNSYLVANIA.

PHOTOGRAPHIC APPARATUS.

Application filed August 14, 1922. Serial No. 581,632.

*To all whom it may concern:*

Be it known that I, LIONEL F. LEVY, a citizen of the United States, residing at Philadelphia, in the county of Philadelphia and State of Pennsylvania, have invented certain new and useful Improvements in Photographic Apparatus, of which the following is a specification.

My invention relates generally to photographic apparatus used in connection with process cameras and more particularly to improvements in focusing arrangements therefor.

In reproduction work by process cameras it has been the general practice to provide the paths, over which the ground glass and lens box travel, with suitable scales by means of which certain ratios between the original object and the reproductions are predetermined at the point of focus and without the use of a focusing screen. Such scales comprise graduations indicating the relative distances each member is to be adjusted to produce desired reductions and enlargements. This system of marking usually consists of correspondingly numbered marks upon the camera bed and the camera stand so that when the front box or lens carrier and the back box or plate and ground glass carrier are brought into register with their respective marks, certain definite and frequently used proportions between the copy and the image are automatically obtained in sharp focus. A very wide range of work finds its way into the modern commercial studio, and in order that all kinds of work may be satisfactorily done the scale in general use comprises a very great number of marks as compared with the relatively few marks which formerly sufficed. When the scale includes such a large number of marks it follows inevitably that at certain parts of the scale the individual marks are so close together that adjustment of the movable members from one mark to register with another becomes very difficult, in fact the marked divisions are hardly distinguishable one from the other. This may be explained by the well known fact that when a reproduction is to be made on a reduced scale the relative movements, of the ground glass or plate carrier with respect to the lens and of the latter with respect to the copy board, are exceedingly small as compared with the corresponding movement in the opposite directions when enlargements of an image are to be made. The technical ratio for one such movement is as follows: Assuming a 20" lens is used, 2:2.1 enlargement calls for a two inch movement of the ground glass away from the lens, while a reduction under the same conditions from 10:10.1 requires a movement of the glass of about two-one-hundredths of an inch towards the lens. This will indicate the difficulty of adjustment of the plate carrier or back box and lens box when correct register with marks spaced but two-one-hundredths of an inch or less apart is essential.

With the foregoing in mind, the principal object of this invention is to provide mechanical means by which the movements of the plate carrier with respect to the camera bed, and of the latter with respect to the camera stand, may be indicated upon a set of scales having indicators which move between points or marks spaced any desired distance apart and representing all of the possible ratios between the original work and the reproductions. By proper manipulation of the usual focusing mechanism the indicators may be brought into register with corresponding numbers on their respective dials, with the result that the image will be in sharp focus at a set ratio upon the sensitive plate.

The invention is fully described in the following specification and set forth in the appended claims, and illustratively exemplified in the accompanying drawings, in which—

Figure 4, is a perspective view of the focusing device used in connection with the plate and ground glass carrier to record the movement and position of the latter with respect to the lens.

Figure 5 is a front elevational view of the device shown in Figure 4; and Figure 6 is a substantially vertical sectional view on the line 6—6 of Figure 5.

Figure 1:
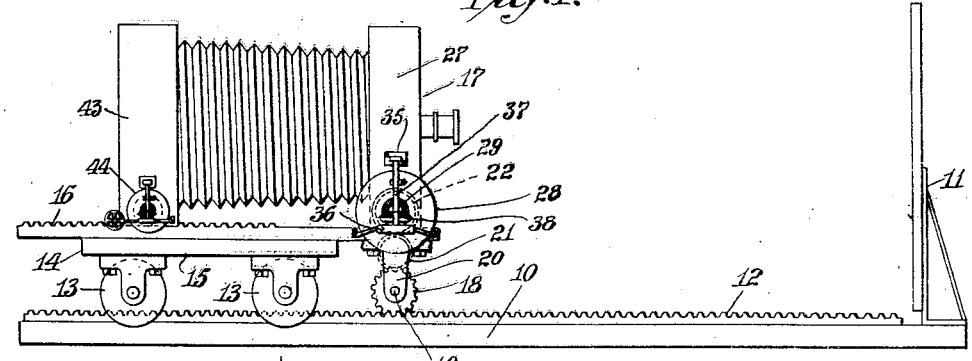
Figure 1 is a side elevational view of a process camera mounted on a camera stand and equipped with the automatic focusing devices.

Referring to the drawings, and particularly to Figures 1, 2 and 3, 10 denotes a camera stand comprising a rectangular frame, which preferably consists of tubing, said frame having an upright copy board 11 disposed transversely across one end thereof. Secured to the upper surface and extending longitudinally of the side members of the frame 10 is a traction member such as a rack 12, above the plane of the tubing and of a width which leaves part of the tube exposed at each side of the rack. Movable longitudinally of the frame 10 and mounted on divided casters 13 supported upon the exposed portion of the tubing beyond the rack 12, is a carriage or camera bed 14, which comprises a rectangular frame 15 having a traction member such as parallel longitudinal racks 16 at opposite sides of the bed.

The device for recording the movement and position of the camera bed 14 and lens box 17 with relation to the camera stand 10 and copy board 11, is operated through a driving gear 18 mounted on a stud shaft 19 supported in suitable bearings 20 hung from the forward projection of the rack 16, the teeth of the said driving gear 18 being in mesh with the teeth of the rack 12. Power is transmitted from the gear 18 through an idler pinion 21 in mesh with a spur gear 22 keyed to a shaft 23 for operating the recording device. The shaft 23 is journaled in a bearing bracket 24 secured to the inner face of bottom wall 25, of the lens box 17, while the gear 22 projects through an opening in this wall into mesh with the pinion 21. The forward projection of the shaft 23 extends freely through an opening 26 in the side wall 27 of the lens box 17 and carries a dial 28 and bevel gear 29 at its forward end. The dial 28 consists of a round metal disc provided with a spiral scale 30 comprising a continuous spiral line, the convolutions of which are suitably graduated at 31 and indicated by numerals, which correspond to the possible ratios of enlargement and reduction between the image and the copy.

The size of the gear 18 for operating the dial will necessarily depend upon the extension of the camera, but in order to clearly illustrate the principle let it be assumed that a camera extension of 60 inches is to be measured, in which case a gear of about 5 inch diameter will require substantially four revolutions to travel this dstance and the scale should have about four complete convolutions on the face of the dial 28. Furthermore, the dial 28 must be of a diameter substantially greater than that of the gear 18 for reasons which will be pointed out hereinafter.

The apparatus just described will cause movement of the dial 28 corresponding to any movement of the camera bed and lens box 17 toward or away from the copy board 11 and it has been assumed that this movement would require four complete revolutions of the dial to register the overall extension of the camera. The graduations 31, as they pass a common fixed radius of the dial 28, (preferably an imaginary perpendicular radius) represent a corresponding proportional longitudinal movement of the lens box 17 and carriage 14 over the camera stand 10, i. e., for each unit of distance between the lens and the copy board required to produce certain copying proportions there will be a corresponding graduation 31 which will register with the imaginary radius referred to above. Furthermore, with four points on the spiral 30 simultaneously intersected by the common radius and for the purpose of illustration assuming that the outermost and innermost extremes of the spiral register with this radius, it follows that it is desirable to make the readings for the most minute movements, in the adjustment of the lens with respect to the copy board, along the convolutions of the spiral 30 which are farthest from the axis of the dial and intersected by the radius. This is so because the outermost convolutions of the spiral 30 have diameters greater than that of the gear 18, and rotary movement of the latter will cause the line of the great arc, i. e., the spiral line, to travel greater distances past the common radius, than will be measured off by a corresponding movement of the periphery of the gear 18 along the rack 12. Hence the readings along these greater arcs may be spaced substantially farther apart than the corresponding degree or unit of movement of the lens with respect to the copy board.

Figure 2:
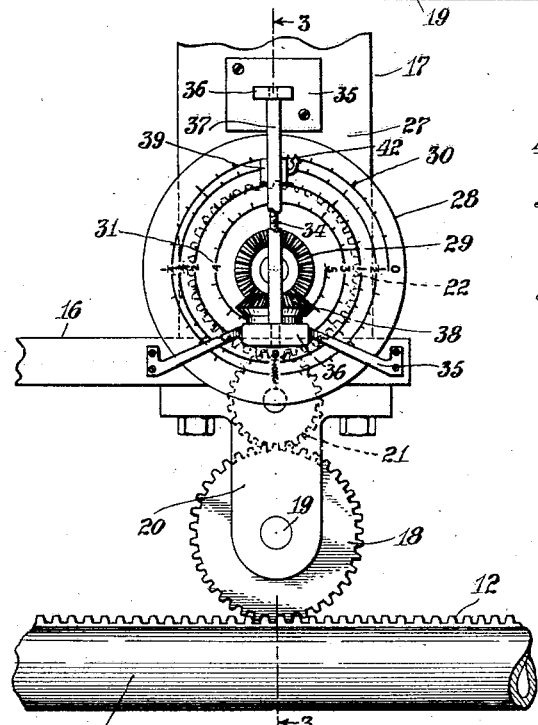
Figure 2, is a front elevational view on an enlarged scale of the focusing device for recording the movement and position of the lens with respect to the copy board.
Figure 3:
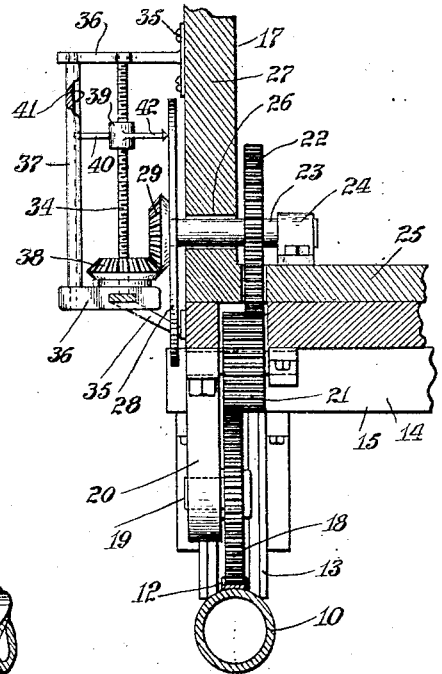
Figure 3, is a substantially vertical sectional view through the focusing device on the lines 3—3 of Figure 2.

In order to utilize this imaginary radius as a line from which readings may be taken by means of a mechanical device, a screw 34 is rotatably mounted in front of the dial face and having an axis which will coincide with the said imaginary radius. Brackets 35 support the screw 34 above and below the selected radius and are secured to the lens box 17 and comprise outwardly disposed arms 36 which project beyond the bearings for the screw and receive the ends of an upright guide member 37, the latter being disposed parallel to the screw itself. Rotary motion is imparted to the screw 34 by the bevel gear 29 in mesh with a bevel gear 38 carried by the lower end of the screw 34. Mounted on the screw 34 and movable axially thereof is a carrier 39 provided with oppositely projecting members, one of which is a slide bar 40 guided in a longitudinal groove 41 cut in the upright member 37. The other projection constitutes a pointer 42 which extends towards the face of the dial 28 and is adapted to constantly follow the convolutions of the spiral line 30. The rate at which the pointer 42 will move along the radius of the dial 28 may be determined by the pitch of the threads of the screw 34 or by the ratio of the bevel gears 29 and 38, and the determined speed of the pointer will be additionally governed by the spacing of the convolutions of the spiral, the spaces between the convolutions being preferably as great as possible. With the pointer, moving radially of the dial and indicating along the convolutions of the rotating spiral 30 at a radius substantially greater than that of the measuring periphery of the gear 18 along the rack 12, it will be apparent that the line travels past the pointer 42 a greater lineal distance per unit of movement than the periphery of the gear moves along the rack 12 the same unit of movement. Therefore, the smaller movements of the camera will be indicated on the dial in greatly increased lengths which are easily readable. The effect upon the readings taken along the convolutions of the spiral 30 which are within the radius of the gear 18, will be the converse of the previously described condition in that the inner convolutions will move past the pointer a smaller distance per unit of movement than the distance measured off by the gear 18 along the rack 12 for the same unit of movement. In this case the distance between marks on the scale will be substantially less than the corresponding distance traveled by the lens with respect to the copy board. It has been found that a common or average distance may be determined between the marks 31 along the spiral line 30, so that all readings indicating the units of distance the lens box 17 may be moved will be shown on the dial by equally spaced indications, as shown in Figure 2.

Referring now to Figures 4, 5 and 6, which illustrate the recording mechanism for indicating movement of the plate and ground glass box 43 with respect to the lens box 17, it will be noted that the dial 44 provided with a spiral line 45, pointer 46 and mechanism for operating same is substantially of the same design and construction as the corresponding parts illustrated and described in connection with the recording device for the camera bed 14 and lens box 17. The only exception is in the relative sizes of the dials 28 and 44 and the means for imparting rotary movement thereto. As process cameras are usually constructed, the back box or plate and ground glass holder unit is slidably mounted on the camera bed 14 and guided in its movement by suitable angle guides shown in Figure 6. Secured to and projecting above the camera bed 14 are the teeth of the parallel racks 16, which are closely adjacent the bottom of the back box itself, so that a direct operative connection may be made between the rack 16 and a shaft 47 carrying the dial 44. This connection is effected through a spur gear 48 fixed to the shaft 47 and meshing with the teeth of the rack 16. For the reason previously stated the outer convolutions of the spiral line 45 have greater diameters than the diameter of the gear 48. It also follows that this spiral line 45 will have approximately four complete convolutions in the spiral 30, and that there will be correspondingly numbered marks 49 on the line 45 to compare with the marks 31 of the line 30. In order to facilitate setting the camera to the proper marks, all the indications on the scale denoting possible reduction ratios may be indicated by fractional numbers while those designating enlarging ratios may be provided with whole numbers.

The operation of the focusing mechanism has been more or less fully described above and it will now suffice to briefly review the operation of the two recording arrangements, as their readings cooperate to indicate the correct relative positions of the focusing members of the camera when the latter members are moved to obtain a sharp focus at certain definite proportions between the image and the reproduction. Assuming that a reproduction is to be made at one half size of the original image, the latter is placed on the copy board in the usual manner and the focusing mechanism operated to first move the camera bed 14 over the camera stand 10 until the pointer 42 of the forward dial 28 registers with the ½ mark on the outer convolutions of the spiral line 30, i. e., the convolutions of the line included in the two greater coils. This operation determines the proportion between the image and the reproduction and the camera will have moved away from the copy board. The usual mechanism for moving the back box 17 relative to the lens box is then operated until the pointer 46 is in register with the ½ mark on the spiral line 45 of the read dial 44, the said ½ mark referred to being the one on the arc of the line that is greater than the diameter of the gear 48. In this action the movement of the back box will be towards the lens. During the operation just described the length of the spiral lines which pass the pointers are substantially greater than the relative distance covered by the camera bed with respect to the camera stand and the back box with respect to the lens box, so that the readings to be taken are between marks a considerable distance apart, as described hereinbefore.

As above noted the convolutions of the spiral scale should be the same in number as the required revolutions of the gear to traverse the traction member, and it may be stated in this connection that there are certain possibilities in changing this ratio so that, for instance, the scale may be made to move faster than the gear and consequently enlarge the actual distance the parts are moved so that small differences, in the camera extension for instance, will be magnified. Of course this would magnify the entire scale as well as magnify one portion of it more than another as is the case in the embodiment illustrated and described.

It has been found desirable in some cases to provide means by which certain theoretical diaphragm openings, for the lens and the screen distances and for different screens, may be indicated along the spiral line of the scale. These indications would preferably be marked along the spiral line 45 of the dial 44 which operates in connection with the camera extension and such indications may be used in addition to the marking denoting the focusing focal distances.

I claim:

1. A focusing device for cameras, comprising a rotatable spiral scale, a member disposed radially of said scale, indicating means movable axially of said member, and means for rotating said member to cause the indicating means to move axially thereof and radially of said scale and to follow the convolutions of the revolving spiral.

2. A focusing device for cameras, comprising a rotatable dial provided with a graduated spiral scale on its face, a shaft upon which said dial is mounted, a screw disposed transversely of said shaft and radially of said dial, means for rotatably supporting said screw at opposite ends thereof, operative connecting means between the said shaft and the screw, and a carrier mounted on said screw and movable axially thereof by rotation of the latter and provided with an indicator adapted to follow the convolutions of said spiral.

3. A focusing device for cameras, comprising a traction member, a train of gears in engagement with said member and operated by movement thereof with respect to said member, a dial rotatable with said gear train and having a spiral scale on its face, and an indicator operatively connected with said dial and adapted to move transversely of the latter and to follow the convolutions of the spiral scale, substantially as described.

4. A focusing device for cameras, comprising a rotatable dial having a spiral scale on the face thereof, indicating means operated by the movement of said dial and comprising a threaded member arranged transversely of the dial and rotatably supported at opposite ends, a carrier mounted on said member and adapted to move axially thereof, the said carrier being provided with a pointer movable radially over the face of said dial and following the convolutions of said scale, and a projection extending outwardly from the carrier, and a guide to receive said projection and prevent rotation of the carrier during axial movement thereof.

5. A focusing device for cameras, comprising a rotatable dial having a scale thereon composed of a graduated spiral line, a shaft upon which said dial is mounted, a driven gear for operating said shaft and having a diameter equal to the diameter at a mid-point along said spiral line of the dial, an indicator movable radially over the face of said dial and along the convolutions of the spiral, and means operatively connecting the shaft and the indicator, whereby travel of the spiral line past the axially moving indicator will be at a differential speed with relation to the peripheral speed of the said driven gear, substantially as described.

6. A focusing device for cameras, comprising a rotatable spiral scale and an indicator movable relatively thereto, and a gear for operating said spiral scale and said indicator and having a diameter which is determined by the distance between given convolutions.

7. In a camera having a relatively fixed stand and copy board and a camera bed movable relatively thereto, the combination with a rack for both the stand and the said bed, of a focusing device operating from each rack and carried by relatively movable focusing elements of said camera, the said focusing devices comprising rotating spiral scales provided with graduations corresponding to certain units of movement between the focusing elements of the camera, and indicating means movable transversely of the scale and adapted to follow the convolutions of the spiral.

8. In a camera having a fixed stand and copy board and a camera bed movable relatively thereto, the combination with a rack for both the stand and the bed, of a plate and screen holder movable relatively to said camera bed and a lens box fixed to said bed and movable relatively to said stand, a focusing device for both the holder and the lens box, said focusing device comprising a rotatable dial having a spiral scale on its face, a shaft for said dial, a driven gear operating said shaft and operated by relative movement with respect to said rack and having a diameter which is determined by the distance between given convolutions of the spiral scale, and indicating means operatively connected with said dial and comprising a threaded transversely disposed member rotating over the face of said dial, the said member being provided with a traveler movable axially thereof and adapted to follow the convolutions of the revolving spiral scale.

9. In a camera the combination with a pair of focusing devices as claimed in claim 8, including substantially equally spaced graduations along said spiral and identified by corresponding indications on both scales.

10. In a focusing device for a camera, the combination with a rack for both a camera stand and a camera bed, of a revolving scale for each rack and comprising a graduated spiral line, indicating means, and means for causing said indicating means to follow the convolutions of said spiral line and including a gear driven from each rack for rotating the scales respectively, the diameter of both gears being greater than the diameters of the inner convolutions of the spiral and smaller than the outer convolutions of the spiral, whereby a unit of movement of a gear over its track will cause the outer convolutions of the spiral to travel past the indicating means a greater unit of movement than measured by the gear and the inner convolutions of the spiral line to travel past the indicating means a shorter unit of movement than measured by the corresponding movement of the gear.

11. A camera focusing device having an indicator and a curved scale cooperable with a gear to cause said indicator to follow the curve of the scale, the curve of the scale being determined by the revolutions the gear is required to make per unit of movement in order to produce relative movement of the indicator with respect to the moving curved line measured in greater units of movement than the corresponding unit of movement of the periphery of the gear.

In testimony whereof I affix my signature.

LIONEL F. LEVY.